(12) United States Patent
Yoneda et al.

(10) Patent No.: US 7,148,593 B2
(45) Date of Patent: Dec. 12, 2006

(54) CONCENTRATED WINDING STATOR COIL FOR AN ELECTRIC ROTARY MACHINE

(75) Inventors: Shigenori Yoneda, Oobu (JP); Soichi Yoshinaga, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/110,797

(22) Filed: Apr. 21, 2005

(65) Prior Publication Data
US 2005/0248228 A1 Nov. 10, 2005

(30) Foreign Application Priority Data
Apr. 21, 2004 (JP) ............................. 2004-125767

(51) Int. Cl.
*H02K 3/18* (2006.01)
*H02K 3/52* (2006.01)
(52) U.S. Cl. .................. 310/71; 310/179; 310/208; 310/260
(58) Field of Classification Search ............ 310/71, 310/179, 203, 208, 254, 260; 29/605
See application file for complete search history.

(56) References Cited

U.S. PATENT DOCUMENTS 6,255,756 B1* 7/2001 Richter ................. 310/208
6,600,244 B1* 7/2003 Okazaki et al. ............. 310/71
2003/0201688 A1 10/2003 Yamamura et al.

FOREIGN PATENT DOCUMENTS

| EP | 1 193 829 A2 | 4/2002 |
| FR | 2 830 994 | 4/2003 |
| JP | A 2001-25198 | 1/2001 |
| JP | A 2001-186703 | 7/2001 |

* cited by examiner

*Primary Examiner*—Darren Schuberg
*Assistant Examiner*—David W. Scheuermann
(74) *Attorney, Agent, or Firm*—Oliff & Berridge, PLC

(57) ABSTRACT

A first layer coil is wound around the surface of a tooth in a direction advancing from a proximal end portion to a distal end portion of this tooth. A second layer coil is wound on the first layer coil in a direction advancing from the distal end portion to the proximal end portion of the tooth coil. Lead wires extend outward in the radial direction from a winding start end of the first layer coil and a winding terminal end of the second layer coil. Respective tooth coils of the same phase are serially connected to arrange three phase windings. A crossover bus bar group is accommodated in a space having a square cross section defined by a core back and a coil end of the tooth coil.

6 Claims, 6 Drawing Sheets

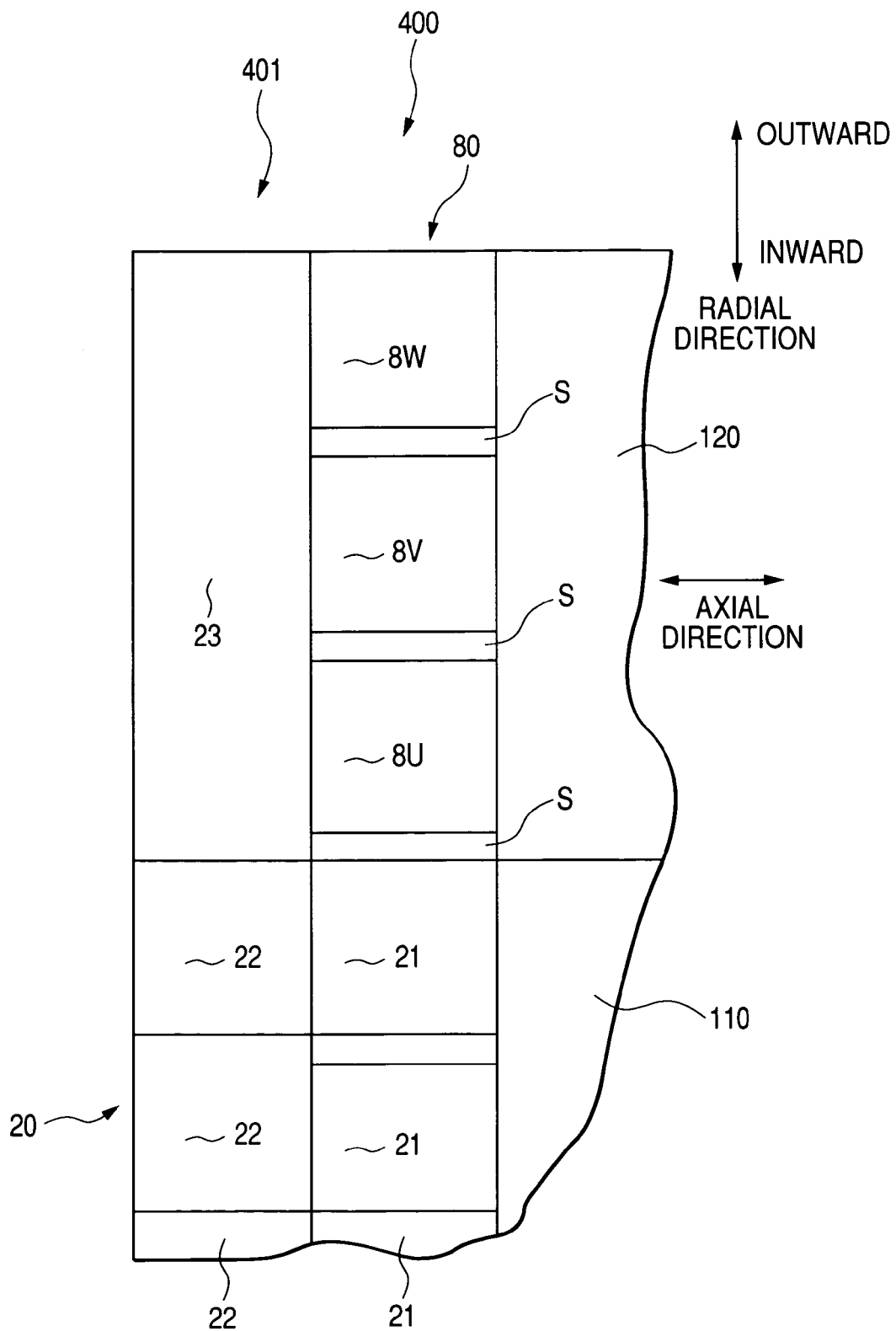

CONCENTRATED WINDING STATOR COIL FOR AN ELECTRIC ROTARY MACHINE

CROSS-REFERENCE TO RELATED APPLICATION

This application is based upon and claims the benefit of priority from earlier Japanese Patent Application No. 2004-125767 filed on Apr. 21, 2004 so that the descriptions of which are incorporated herein by reference.

BACKGROUND OF THE INVENTION

The present invention relates to a concentrated winding stator coil for an electric rotary machine.

A concentrated winding stator, conventionally proposed in the field of electric rotary machines, includes a plurality of phase windings each consisting of same phase coils connected with each other and wound in a concentrated manner around respective teeth of a stator core (hereinafter, referred to as tooth coils). From requirements of the winding work, this kind of concentrated winding stator is generally used for an assembled core which is formed by assembling separated partial cores of respective teeth into a stator core.

The tooth coils of a concentrated winding stator are wound around the teeth to have a required turn number. Two neighboring turns are usually disposed to be adjacent to each other in the axial direction on a circumferential surface of the tooth. The winding order for this concentrated winding stator is as follows.

First, the winding work starts from one radial end side of a tooth to the other radial end side of this tooth to arrange a first layer coil. Then, turning the advancing direction, the winding work restarts from the other radial end side of the tooth to the one radial end side of this tooth. Thus, a second layer coil is arranged on the first layer coil. Similarly, a third layer coil is arranged on the second layer coil so as to realize highly densified winding. The first layer coil, the second layer coil, and the third layer coil are collectively referred to as "layer coils", in the following description.

The Japanese patent application Laid-open No. 2001-186703 discloses, as a tooth coil winding arrangement for a concentrated winding stator, a tooth coil with a starting end disposed at a proximal end portion (or distal end portion) of a tooth and a terminal end disposed at a distal end portion (or proximal end portion) of the tooth. Furthermore, this prior art document discloses, as another tooth coil winding arrangement, a tooth coil with starting and terminal ends being both disposed at the distal end portion of a tooth.

However, the tooth coils disclosed in the above-described prior art document have the following problems.

First, in the process of arranging a phase winding by connecting tooth coils of the same phase via crossovers in serial or parallel to each other, at least one end of each tooth coil is positioned at the distal end portion of the tooth. In the case of using short crossovers, the crossovers or lead wires extending from end portions of the tooth coils and connected to the crossovers will be positioned very closely to the cylindrical surface of a rotor. If these wires are loosened and subjected to vibrations, there will be the possibility that the wires contact with the rotor.

Next, it is necessary to perform the wire connection work at an outer side of an end face of a tooth in the axial direction, for connecting a lead wire extending from a distal end portion (i.e. one end) of this tooth with a lead wire extending from one end of other tooth. Performing such a wire connection work near the tooth coils or slots is not easy.

Next, the arrangement requiring crossovers or lead wires disposed on the tooth coils wound around respective teeth will necessarily increase the axial length of the stator and also increase the armature resistance. These problems are especially serious when a conductor having a large cross-sectional area is used for the tooth coil, because it is necessary to use a comparable conductor having an equivalent cross-sectional area for the crossover intervening between the tooth coils or lead wires of respective tooth coils.

One method for solving these problems is connecting respective tooth coils in parallel with each other to reduce the current flowing in each tooth coil. It will become possible to reduce a required cross-sectional area of a conductor used for the tooth coil. However, to realize this arrangement, it is necessary to increase the turn number of each tooth coil to compensate the loss of magnetic force corresponding to reduction of the current flowing in the tooth coil. According to the concentrated winding stator, the required increase in the turn number should be considered separately for the case that all of the tooth coils of the same phase are connected in parallel with each other as well as for the case that all of the tooth coils of the same phase are connected in serial with each other. If the turn number of the former case is x times as large as that of the latter case while the conductor of the former case is 1/x times as larger in cross-sectional area as that of the latter case, the former case and the latter case should be theoretically identical. However, in the case of connecting all of the tooth coils of the same phase in parallel with each other, it is necessary to coaxially and annularly dispose crossover bus bars of respective phases and neutral bus bars around the stator core. More specifically, the crossover bus bars are used for applying the phase voltages to respective tooth coils. The neutral bus bars form a neutral point. As a result, a large bus bar accommodation space is required.

Furthermore, due to damage or deterioration of a resin coating film of the tooth coil conductor, the possibility of lessening electric insulation properties between neighboring turns of each tooth coil will greatly increase.

Furthermore, coating a thin tooth coil conductor with a resin film and winding this coil conductor densely around a tooth is not preferable in assuring satisfactory cooling properties for the coil conductor positioned deeply in the layers of turns. Namely, the resin coating film of respective tooth coils and numerous clearances between adjacent turns will increase the heat transfer resistance so greatly that large current cannot be supplied to the tooth coil. As a result, the electric rotary machine undesirably increases its size.

For example, to realize a compact and lightweight electric rotary machine having a concentrated winding stator, it is important to increase the cross-sectional area of a tooth coil conductor as far as requirements of the circuit specs are satisfied, shorten a total elongated distance of the armature winding, and bring all turns of the tooth coil into contact with tooth or with cooling air.

To realize such an optimum tooth coil, it will be understood that a desirable tooth coil should have turns of only one layer or two layers wound around a tooth and respective tooth coils of the same phase should be serially connected.

However, in this case, the cross-sectional area of the tooth coil conductor becomes very larger. For example, according to a conventional concentrated winding stator disclosed in the above-described prior art document, the axial length of the concentrated winding stator increases by an amount of the lead wires and the crossovers of tooth coils extending on the tooth coils. As a result, the electric rotary machine undesirably increases its size.

SUMMARY OF THE INVENTION

In view of the above-described problems, this invention has an object to provide a concentrated winding stator coil for an electric rotary machine which is not only compact and lightweight but also excellent in cooling and insulating properties.

In order to accomplish the above and other related objects, the present invention provides a concentrated winding stator coil for an electric rotary machine including tooth coils provided for respective teeth, a predetermined number of crossover bus bars, and neutral bus bars. Each tooth coil includes a first layer coil wound on the surface of a tooth of a stator core in a direction advancing from a proximal end portion to a distal end portion of the tooth, a second layer coil disposed on the first layer coil and wound in a direction advancing from the distal end portion to the proximal end portion of the tooth, a winding start end and a winding terminal end disposed adjacently to the proximal end portion of the tooth, and a pair of lead wires extending outward in the radial direction from the winding start end and the winding terminal end. The crossover bus bars are disposed in a circumferential direction to successively connect the lead wires of the tooth coils having the same phase, so as to arrange a phase winding consisting of all of the tooth coils having the same phase and serially connected. And, the neutral bus bars connect the terminal ends of final tooth coils of respective phases to form a neutral point.

According to the concentrated winding stator coil of the present invention, the crossover bus bars and the neutral bus bars are provided adjacently to a radial outer side of a coil end protruding in an axial direction of the tooth coil and also adjacently to one end face of a core back of the stator core.

More specifically, the concentrated winding stator coil for an electric rotary machine according to this invention employs a tooth coil consisting of a pair of (i.e. first and second) layer coils, the winding of which starts in a direction advancing from a core back side (i.e. from a proximal end portion of the tooth) to a distal end portion of the tooth and then returns from the distal end portion toward the proximal end portion. This is hereinafter referred to as a proximal end extraction type two-layer winding coil. According to this stator coil, both of the winding start end and the winding terminal end of the tooth coil are disposed at the proximal end portion of the tooth (i.e. at the side adjacent to the core back of the stator core).

Furthermore, all of the tooth coils of the same phase are serially connected to arrange a phase winding. The lead wires extend outward in the radial direction from the starting end and the terminal end located at the proximal end portion of the tooth along an end face of the core back. Both of the crossover bus bars and the neutral bus bars are substantially accommodated in a bus bar accommodation space whose two sides are defined by the coil end of the tooth coil and the end face of the core back.

The concentrated winding stator coil for an electric rotary machine according to this invention brings the following effects.

This arrangement brings the effect of suppressing increase in the resistance loss, because the length of the crossover connecting two teeth can be minimized. The crossovers and the joint portions of crossovers and the lead wires of the tooth coil can be located far from the cylindrical surface of the rotor. This is effective in preventing the wires from contacting with the rotor. The work for installing the rotor into its housing becomes easier. Furthermore, disposing both of the winding start end and the winding terminal end of the tooth coil at the proximal end side of the tooth makes it possible to locate the lead wires of the tooth coil or the crossovers adjacently to the end face of the core back of the stator core and accordingly brings the effect of reducing the length of the stator in the axial direction.

First, even in a case that all of the tooth coils of the same phase are serially connected and the tooth coil conductor has a larger cross-sectional area, none of the lead wires and the crossovers extend on the tooth coil. Thus, the tooth coil portion gives no adverse effect on suppressing the axial length of the concentrated winding stator. This makes it possible to arrange a phase winding by serially connecting all of the tooth coils of the same phase without increasing the axial length of the concentrated winding stator. Thus, the above-described effects of serially connecting the tooth coils can be ensured without causing any problems. In other words, reducing the size of the neutral bus bars and simplifying the accommodation of these bus bars bring the effects of realizing a compact concentrated winding stator, reducing insulation failure between the turns of the tooth coil, and improving heat radiation properties of the tooth coils. Furthermore, serially connecting the tooth coils of the same phase is effective in simplifying the wiring structure of the crossover bus bars as well as in reducing a necessary volume for the bus bar accommodation space.

Next, the bus bar accommodation space is a vacant space remaining in the vicinity of the end face of the core back. In other words, a useless space can be effectively utilized. The axial length of the concentrated winding stator does not increase. Furthermore, the wire connection work becomes easier. Next, locating both of the starting end and the terminal end of the tooth coil at the proximal end portion of the tooth makes it possible to minimize the distance between the tooth coil and the bus bar of the above-described bus bar accommodation space. The total elongated distance of the lead wires can be shortened. The electric resistance of the armature coil can be reduced. Cooling properties can be assured even in a case that the current supplied to the coil is large.

As described above, this invention is based on the proximal end extraction type two-layer winding stator coil and is characterized in that the crossover bus bars and the neutral bus bars are disposed adjacently to the core back. Thus, this invention can provide a compact and lightweight electric rotary machine and also realize a concentrated winding stator coil for the electric rotary machine having excellent cooling and insulating properties.

According to a preferred embodiment of the present invention, the crossover bus bars are accommodated in the bus bar accommodation space which is shorter than the height of the coil end in an axial direction and shorter than a diameter of the core back. This arrangement is effective in suppressing increase in the axial length or the radial length of the concentrated winding stator. Thus, it becomes possible to reduce the size and weight of the concentrated winding stator including its housing.

According to a preferred embodiment of the present invention, the lead wires of respective tooth coils are connected to the crossover bus bars and the neutral bus bars in the bus bar accommodation space. This arrangement is effective in further reducing the size of the concentrated winding stator.

According to a preferred embodiment of the present invention, the neutral bus bars are disposed at the positions identical in both axial and radial directions with those of the bus bars of predetermined phase. Namely, in the case that all of the tooth coils having the same phase are serially connected, the length of each crossover bus bar can be shortened. This effectively forms a vacant space in both axial and radial directions. According to this embodiment, this vacant space is utilized as a space where the neutral bus bar is disposed. Thus, the bus bar accommodation space can be further reduced.

According to a preferred embodiment of the present invention, the crossover bus bars are offset in the axial direction in a predetermined phase order, and the crossover bus bars of the same phase are disposed at same positions in both axial and radial directions. Disposing respective crossover bus bars in this manner makes it possible to locate the wire joint portions at same positions in the radial direction when the lead wires extending outward in the radial direction from respective tooth coils are connected to the crossover bus bars. Furthermore, all of the wire joint portions are exposed in the axial direction. Thus, it becomes possible to simply and accurately perform the welding work of all wire joint portions in the axial direction.

According to a preferred embodiment of the present invention, the crossover bus bars are offset in the a radial direction in a predetermined phase order, and the crossover bus bars of the same phase are disposed at same positions in both axial and radial directions. According to this arrangement, the lead wires of the tooth coils of each phase are brought into contact with the crossover bus bars to be connected with each other. Thus, it is unnecessary to bend the coil of each phase in the axial direction. Furthermore, using the spot welding is preferable to simultaneously accomplished from the axial direction. Thus, the wire connection work of the lead wires and the crossover bus bars can be simplified.

In this case, it is preferable that the lead wires are extended substantially in the radial direction toward the phase bus bars and the neutral bus bars, and connected to the crossover bus bars and the neutral bus bars at same positions in the axial direction.

Moreover, it is preferable that respective bus bars are accommodated in a bus bar holder fixed to an axial end face of the core back and having bus bar accommodation grooves formed for respective phases. According to this arrangement, it becomes possible to arrange the bus bars of respective phases in a simple and highly densified fashion.

BRIEF DESCRIPTION OF THE DRAWINGS

The above and other objects, features and advantages of the present invention will become more apparent from the following detailed description which is to be read in conjunction with the accompanying drawings, in which:

FIG. 6 is an enlarged cross-sectional view showing crossover bus bars of a stator employing proximal end extraction type two-layer winding stator coils in accordance with a third embodiment of the present invention.

DESCRIPTION OF THE PREFERRED EMBODIMENTS

An electric rotary machine employing concentrated winding stator coils will be explained in accordance with preferred embodiments of the present invention.

First Embodiment

Overall Structure

Figure 1:
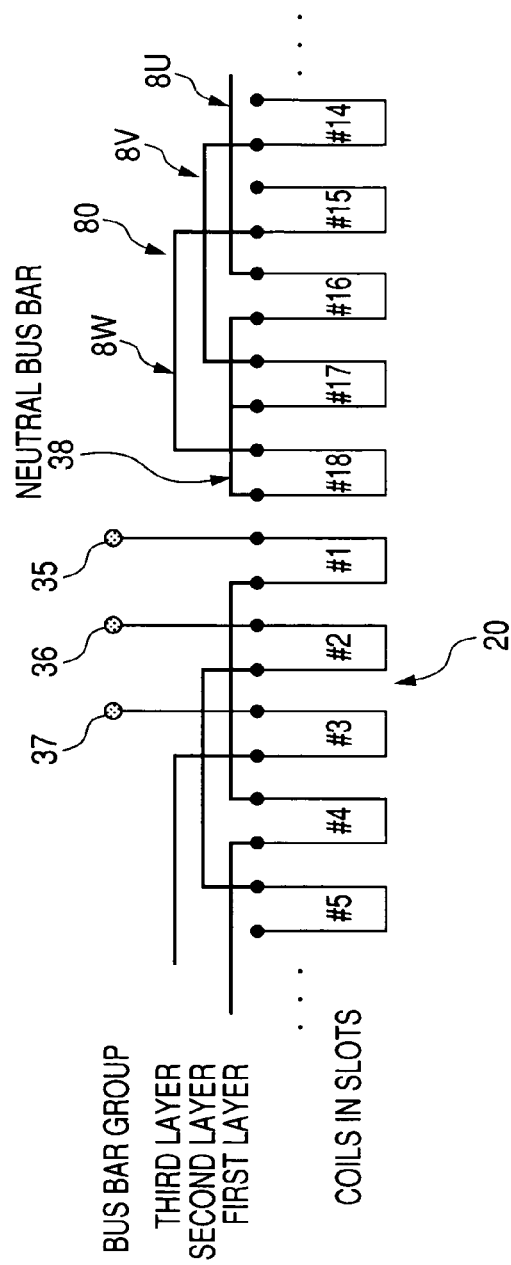
FIG. 1 is a view explaining the wiring of a concentrated winding stator coil in accordance with a first embodiment of the present invention.
Figure 2:
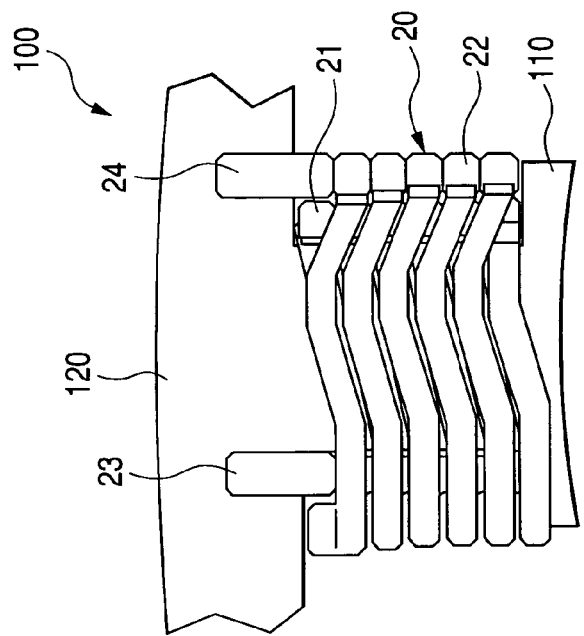
FIG. 2 is a front view showing a tooth coil used for the concentrated winding stator coil shown in FIG. 1.
Figure 3B:
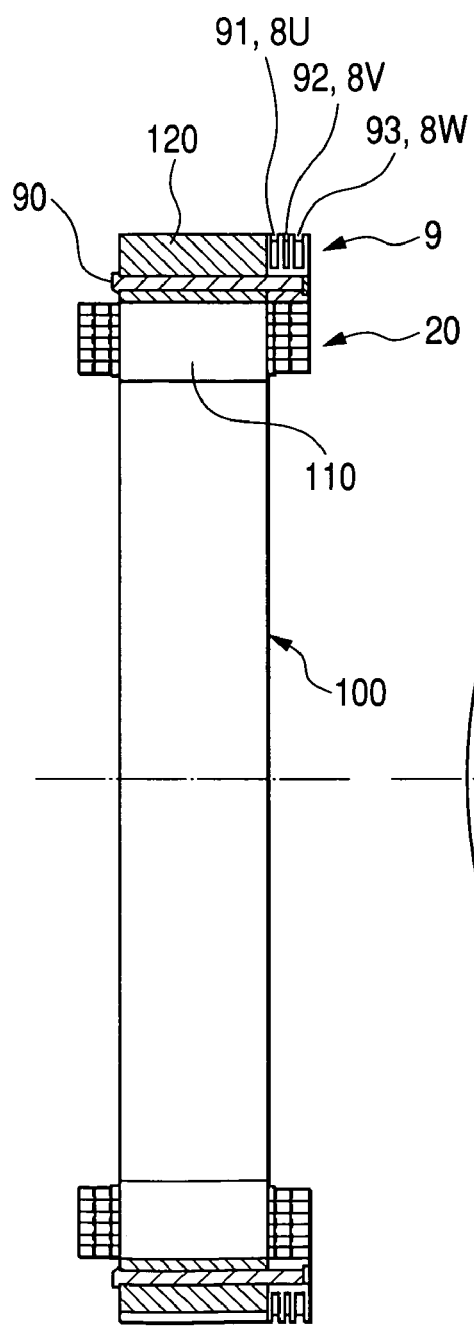
FIG. 3B is a side cross-sectional view showing the stator shown in FIG. 3A, taken along a plane extending along the axial direction.

A concentrated winding stator having proximal end extraction type two-layer winding coils in accordance with a first embodiment of the present invention will be explained with reference to FIG. 1 showing a wiring arrangement, FIG. 2 showing an enlarged front view of a tooth and its periphery, FIG. 3A partly showing a front view of the stator, FIG. 3B showing a side cross-sectional view of the stator, and FIG. 4 partially showing an enlarged front view of a bus holder. A stator core 100 consists of a total of 18 teeth 110 and a single core back 120. The stator core 100 is arranged by multilayered electromagnetic steel plates. The stator core 100 has an assembled core structure, although FIG. 2 does not show the details of the assembled core structure.

Each tooth 110 protrudes inward in the radial direction from an inner cylindrical surface of the core back (i.e. yoke) 120. The teeth 110 are disposed at constant angular pitches in the circumferential direction. Each tooth 110 has a partially cylindrical surface located at the radial inner side thereof so as to confront with a rotor (not shown). Tooth coils 20 are wound around respective teeth 110 so as to form three-phase stator coils. The three-phase stator coils have external connecting terminals 35 to 37 to which three-phase AC voltages are applied. The eighteen tooth coils 20, each being wound around a tooth 110, are classified into three groups each consisting of six tooth coils of the same phase. Accordingly, one pole-pair of the rotor (not shown) has a circumferential pitch corresponding to 3 tooth coils.

Tooth Coil

Next, the tooth coil 20 will be explained in more detail with reference to FIG. 2. The tooth coil 20 is a flat type copper wire sheathed with a resin coating film and wound around a corresponding tooth 110 so as to form two layers of the coil. More specifically, the tooth coil 20 consists of a first layer coil 21 wound around the tooth 110, a second layer coil 22 wound on and around the first layer coil 21, a lead wire 23 extending from a winding start end of the first layer coil 21, and a lead wire 24 extending from a winding terminal end of the second layer coil 22. Each tooth 110 has a square rod shape. Thus, the first layer coil 21 and the second layer coil 22 of the tooth coil 20, when wound around the tooth 110, form a rectangular coil shape with four straight edges. Among four edges, the axial end face of the stator core 100 is referred to as a front edge from which the lead wires 23 and 24 are extended.

The lead wires 23 and 24, as shown in FIG. 2, are disposed at both sides of the intervening tooth 110 in the circumferential direction. Furthermore, both of the lead wires 23 and 24 are disposed at the same end of the tooth 110 in the axial direction. The lead wires 23 and 24 are extended outward in the radial direction along one end face of the core back 120. More specifically, the lead wire 23 extends inward in the radial direction along the core back 120 and reaches a proximal end portion of the tooth 110. Then, the lead wire 23 is bent perpendicularly toward the back of the drawing sheet so as to merge into the winding start end of the first layer coil 21. On the other hand, the lead wire 24 extends inward in the radial direction along the core back 120 and reaches the proximal end portion of the tooth 110. Then, the lead wire 24 is bent perpendicularly toward the back of the drawing sheet so as to merge into the winding terminal end of the second layer coil 22. Each of the first layer coil 21 and the second layer coil 22 has 6 turns. The tooth coil 20 has 12 turns. Respective turns of the first layer coil 21 are disposed on the tooth 110 to form a same layer cooperatively in a direction advancing from the proximal end portion to the distal end portion of the teeth 110. The second layer coil 22 has a start turn connected to and returned from a final turn of the first layer coil 21. Respective turns of the second layer coil 22 are disposed on the first layer coil 21 to form a same layer cooperatively in a direction advancing from the distal end portion to the proximal end portion of the teeth 110. Namely, each tooth coil 20 has the winding start end and the winding terminal end which are respectively disposed at the proximal end portion of the tooth 110.

According to this arrangement, both of the winding start end and the winding terminal end of the tooth coil 20 can be disposed at the proximal end portion of the tooth 110, i.e. at the side adjacent to the core back 120. The length of a crossover connecting one tooth coil 20 to other tooth coil 20 can be shortened. The resistance loss in the crossover can be minimized, and accordingly heat generation can be suppressed adequately. The crossovers and the connecting portions of the crossovers and the lead wires 23 and 24 of the tooth coil 20 are located far from the cylindrical surface of the rotor. Thus, it becomes possible to prevent the wires from contacting with the rotor. The rotor can be easily installed in its housing. Furthermore, it becomes possible to prevent the axial length of the stator from increasing because the lead wires 23 and 24 of the tooth coil 20 or the crossovers do not ride on the tooth coil 20. Furthermore, according to this embodiment, there is no substantial dislocation or offset between circumferential extracting positions of a pair of lead wires 23 and 24 extended from the winding start end and the winding terminal end of the tooth coil 20 toward the core back of the stator core 100. Thus, the wire connection work becomes easier in connecting the lead wires 23 and 24 with the crossovers.

Furthermore, according to this embodiment, the winding start end and the winding terminal end of the tooth coil 20 are disposed at both sides of the proximal end portion of the tooth 110 in the circumferential direction. The lead wires 23 and 24 are extended in the direction advancing from the proximal end portion of the tooth 11 to the core back of the stator core from circumferential both sides of the tooth 11. The lead wire 23 extending from the winding start end of the tooth coil 20 and the lead wire 24 extending from the winding terminal end of the tooth coil 20 can be easily bent toward the radial direction by utilizing an edged portion of the core back 120 facing to a slot bottom portion. As a sufficient clearance is secured between these lead wires 23 and 24, terminals of the lead wires can be easily processed. Furthermore, according to this embodiment, two lead wires 23 and 24 are positioned at the same side in the axial direction with respect to the core back 120 when these lead wires 23 and 24 are extended from the circumferential both ends of the proximal end portion of the tooth 110. Thus, the lead wires 23 and 24 of the tooth coil 20 can be connected with the crossovers disposed between the teeth (including crossovers defining a neutral point) at one side of the core back 120 in the axial direction. The connection work becomes easier.

Phase Winding Arrangement

A three-phase winding structure arranged by the tooth coils 20 will be explained with reference to FIG. 1. The three phase windings, each consisting of six (i.e. 18/3) tooth coils 20 of the same phase, are star-connected. The tooth coils 20 shown in FIG. 1 are respectively assigned serial numbers #1 to #18 and are disposed successively in a counterclockwise direction, although the tooth coils #6 to #13 are not shown.

The tooth coils 20 of the same phase are successively connected in series in the circumferential direction to arrange a phase winding. The three-phase windings, each being formed in this manner, are mutually star-connected with a neutral bus bar 38. The external connecting terminal 35 of U-phase winding, the external connecting terminal 36 of V-phase winding, and the external connecting terminal 37 of W-phase winding are mutually spaced at one-tooth pitches and are extended outward in the radial direction from the tooth coil 20. The tooth coils #1, #4, #7, #10, #13, and #16 are tooth coils 20 mutually connected in series to arrange the U-phase winding. The tooth coils #2, #5, #8, #11, #14, and #17 are tooth coils 20 mutually connected in series to arrange the V-phase winding. The tooth coils #3, #6, #9, #12, #15, and #18 are tooth coils 20 mutually connected in series to arrange the W-phase winding.

A three-phase crossover bus bar group 80 is disposed at the outside of respective tooth coils 20 in the radial direction and disposed adjacently to one end face of the core back 120. More specifically, the three-phase crossover bus bar group 80 consists of a U-phase crossover bus bar 8U, a V-phase crossover bus bar 8V, and a W-phase crossover bus bar 8W.

The U-phase crossover bus bar 8U can be referred to as a first-layer bus bar. The V-phase crossover bus bar 8V can be referred to as a second-layer bus bar. And, the W-phase crossover bus bar 8W can be referred to as a third-layer bus bar.

Figure 3A:
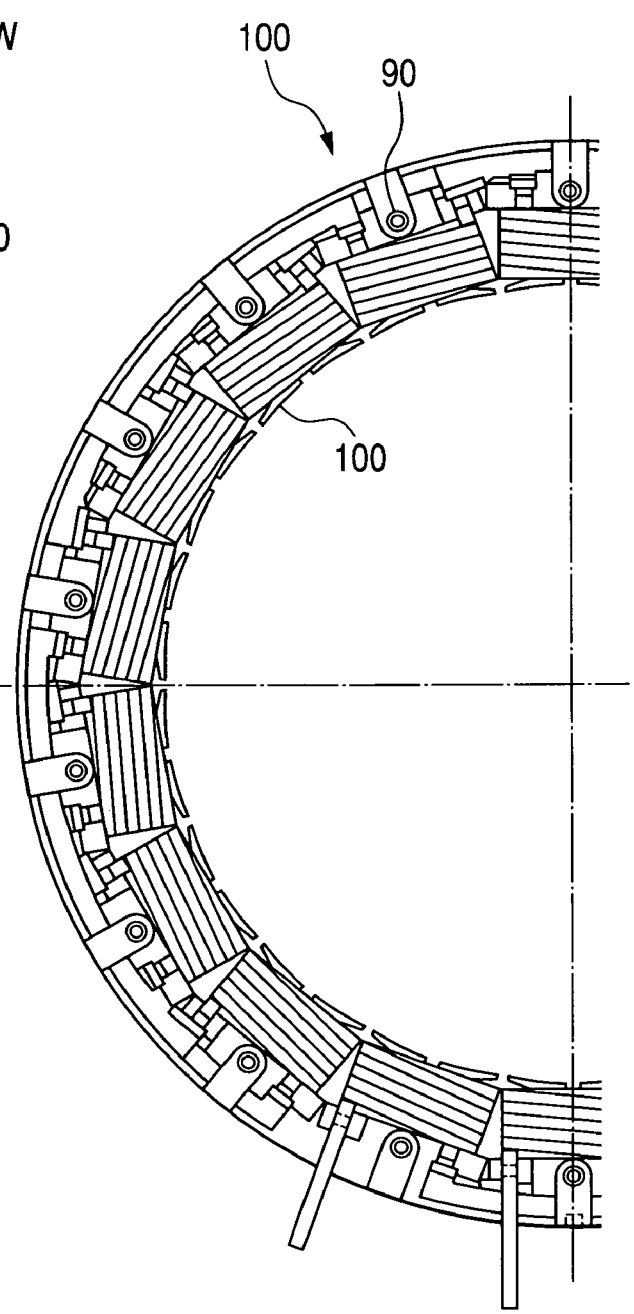
FIG. 3A is a front view partly showing a stator in accordance with the first embodiment of the present invention.

As shown in FIGS. 3A and 3B, a bus bar holder 9 is fixed to one end face of the core back 120 by means of bolts 90. The bus bar holder 9 has bus bar accommodation grooves 91 to 93 arrayed in the axial direction. The U-phase crossover bus bar (i.e. first-layer bus bar) 8U is accommodated in the bus bar accommodation groove 91. The V-phase crossover bus bar (i.e. second-layer bus bar) 8V is accommodated in the bus bar accommodation groove 92. The W-phase crossover bus bar (i.e. third-layer bus bar) 8W is accommodated in the bus bar accommodation groove 93. Furthermore, the neutral bus bar 38 is accommodated in the bus bar accommodation groove 91.

Figure 4:
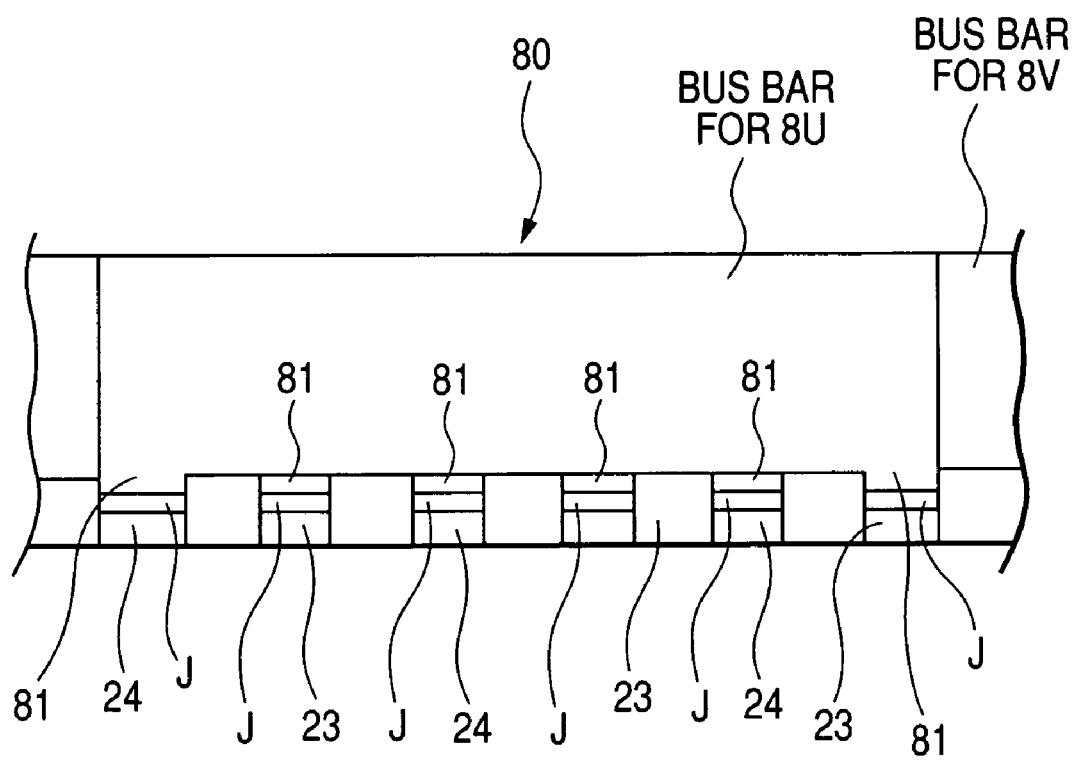
FIG. 4 is an enlarged front view showing a bus holder together with crossover bus bars and lead wires in accordance with the first embodiment of the present invention.

As shown in FIG. 4, respective crossover bus bars of the three-phase crossover bus bar group 80 and the neutral bus bar 38 have wire joint portions 81 slightly protruding inward in the radial direction from the bus bar holder 9. All of the wire joint portions 81 are provided at the same position in the radial direction, i.e. at the inner end portions of respective crossover bus bars 80U, 80V, and 80W in the radial direction. Of the bus bars consisting of the three-phase crossover bus bar group 80, the bus bars used for connecting the lead wires respectively have two wire joint portions 81 positioned at the circumferential ends thereof. The bus bars connected at one end to the external connecting terminals 35 to 37 respectively have only one wire joint portion 81. Furthermore, the neutral bus bar 38 has three wire joint portions 81 positioned at both ends and the central portion in the circumferential direction.

Respective wire joint portions 81 are disposed at the outside of the extending position of the lead wire 23 or 24 of each tooth coil 20 in the circumferential direction, i.e. at the outside of the starting or terminal end of each tooth coil 20 in the circumferential direction. With this arrangement, the starting end and the terminal end of respective tooth coils 20 can be connected to the bus bar with very short lead wires 23 and 24. More specifically, two circumferential end portions of the bus bar connecting one tooth coil 20 and other tooth coil 20 are bent inward in the radial direction to form the above-described wire joint portions 81. The lead wires 23 and 24 are formed by extending the conductor wire of the tooth coil 20 until they reach the wire joint portions 81 of the above-described bus bars. In other words, this invention arranges the lead wires 23 and 24 by elongating both end portions of the tooth coil 20 from the starting end and the terminal end of this invention to the wire joint portions 81 of the above-described bus bars. The distal end portions of respective lead wires 23 and 24 are welded to the radial inner ends of the wire joint portions 81, as indicated by "J" in FIG. 4. FIG. 4 omits the bus bar holder 9. Furthermore, the three-phase crossover bus bars are partly overlapped with each other in the circumferential direction. In FIG. 4, the W-phase crossover bus bar (i.e. third layer bus bar) 8W and the V-phase crossover bus bar (i.e. second layer bus bar) 8V are concealed beneath the U-phase crossover bus bar (i.e. first layer bus bar) 8U.

As understood from the above explanation, according to this embodiment, the lead wires 23 and 24 of the tooth coils 20 are connected to the wire joint portions 81 of respective phase bus bars provided at the same radial positions. In other words, the wire joint portions 81 of U-, V-, and W-phase bus bars are disposed at the same position in the radial direction but are offset from each other in the axial and circumferential directions. More specifically, the three-phase crossover bus bars (i.e. U-, V-, and W-phase bus bars) are offset in the axial direction in a predetermined phase order. And, the crossover bus bars of the same phase are disposed at same positions in both axial and radial directions. Furthermore, as shown in FIG. 4, the wire joint portions 81 of each bus bar slightly protrude inward in the radial direction. Thus, the work for welding the lead wires 23 and 24 of respective tooth coils 20 to the wire joint portions 81 can be easily and surely accomplished without interfering with not only this bus bar but also other bus bars overlapping with this bus bar in the axial direction. The bolts 90, respectively used to fix the bus bar holder 9, are disposed at the centers of respective teeth 110 in the circumferential direction as shown in FIGS. 3A and 3B. Thus, the bolts 90 cause no interference with the extracting work of the lead wires 23 and 24 or with the welding work of the wire joint portions 81. The bolts 90 can be used to fix respective teeth 110 to the core back 120 together with the bus bar holder 9.

According to this embodiment, all of the bus bars and the bus bar holder 9 supporting these bus bars are accommodated in an annular space having a square cross section defined by the height of the tooth coil 20 protruding in the axial direction, i.e. a coil end width of the tooth coil 20, and an end face of the core back 120 perpendicular to the axial height of the tooth coil 20. Accordingly, the first embodiment can realize a compact electric rotary machine.

Second Embodiment

Figure 5A:
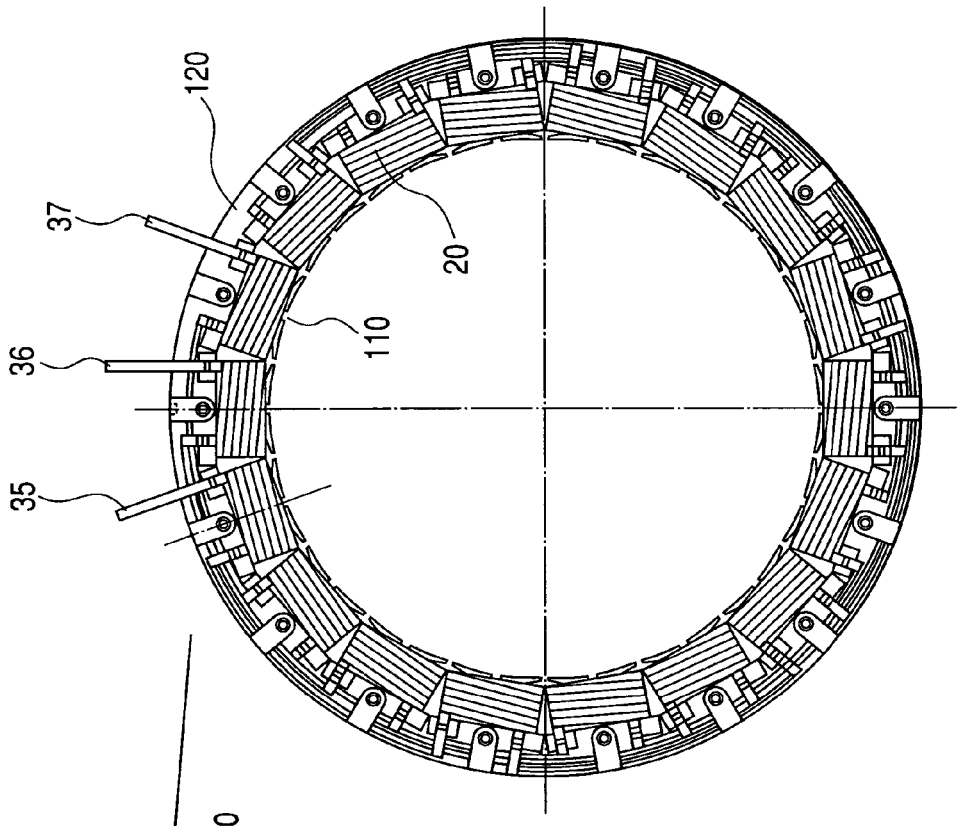
FIG. 5A is a front view showing a concentrated winding stator in accordance with a second embodiment of the present invention.
Figure 5B:
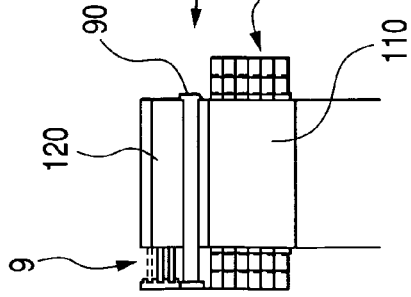
FIG. 5B is a cross-sectional view partly showing the stator shown in FIG. 5A, taken along a plane extending in an axial direction.

A second embodiment of the present invention will be explained with reference to FIGS. 5A and 5B. FIG. 5A is a front view of a concentrated winding stator including proximal end extraction type two-layer winding coils in accordance with the second embodiment. FIG. 5B is a cross-sectional view of the stator shown in FIG. 5A, taken along a plane extending in an axial direction. This embodiment is different from the above-described first embodiment in the arrangement of three-phase crossover bus bars. More specifically, according to this embodiment, the three-phase crossover bus bars are offset in the radial direction in a predetermined phase order. And, the crossover bus bars of the same phase are disposed at same positions in both axial and radial directions. On the other hand, according to the first embodiment, the three-phase crossover bus bars are offset in the axial direction in a predetermined phase order. And, the crossover bus bars of the same phase are disposed at same positions in both axial and radial directions.

According to this embodiment, the U-phase crossover bus bar 8U, the V-phase crossover bus bar 8V, and the W-phase crossover bus bar 8W are successively offset in the radial direction and accommodated in the bus bar holder 9. Similarly, the neutral bus bar 38 is accommodated at the position identical with that of the U-phase crossover bus bar 8U in both axial and radial directions. It is preferable that the bus bar holder 9 has partition walls for separating respective bus bars, so that the crossover bus bars can be accommodated compactly.

According to this embodiment, all of the bus bars and the bus bar holder 9 supporting these bus bars are accommodated in an annular space having a square cross section defined by the height of the tooth coil 20 protruding in the axial direction, i.e. a coil end width of the tooth coil 20, and an end face of the core back 120 perpendicular to the axial height of the tooth coil 20. Accordingly, like the first embodiment, this embodiment can realize a compact electric rotary machine.

Third Embodiment

A third embodiment of the present invention will be explained with reference to FIG. 6. FIG. 6 is an enlarged cross-sectional view showing a crossover bus bar group 80 of a concentrated winding stator including proximal end extraction type two-layer winding coils according to this embodiment, taken along the axial direction.

This embodiment shows a modified example of the second embodiment which is characterized in that the crossover bus bars of each phase are offset in the radial direction in a predetermined phase order. According to this embodiment, respective bus bars consisting of the crossover bus bar group 80 and the neutral bus bar 38 (shown in the first embodiment) are flat type wires which have the cross section identical with that of the tooth coil 20 and are preferably sheathed with a resin coating film, and are formed by elongating the lead wires 23 and 24 extending from the tooth coils 20.

According to this embodiment, the radial width of the core back 120 is equal to or greater than the width of 3 turns of the tooth coil 20. The U-phase crossover bus bar 8U, the V-phase crossover bus bar 8V, and the W-phase crossover bus bar 8W are respectively brought into contact with the end face of the core back 120. The U-phase crossover bus bar 8U, the V-phase crossover bus bar 8V, and the W-phase crossover bus bar 8W respectively have an axial width substantially identical with that of the axial width of the first layer coil 21 of the tooth coil 20.

The lead wires 23 and 24 of each tooth coil 20 extend outward in the radial direction from the axial position of the second layer coil 22 of the tooth coil 20. Regarding the lead wire 24, no wiring problem will arise because the lead wire 24 is inherently disposed in this manner because it is extended from the terminal end of the second layer coil 22 outwardly in the radial direction. Furthermore, the lead wire 23 extending from the starting end of the first layer coil 21 extends inward in the radial direction at the position adjacent to the outer side of respective crossover bus bars 8U, 8V and 8W in the axial direction. Then, the lead wire 23 is bent in the axial direction at the position corresponding to the final turn positioned at the proximal end side of the second layer coil 22 of the tooth coil 20. Then, the lead wire 23 extends across the slot along a surface of the tooth 110 confronting with the slot. Accordingly, the final turn of the second layer coil 22 is formed into an appropriate shape so that the lead wire 23 can extend in the above-described manner.

According to the above-described arrangement, the lead wires 23 and 24 of each tooth coil 20 are respectively positioned adjacently to the crossover bus bars 8U, 8V and 8W. The lead wires 23 and 24 can extend outward in the radial direction as shown in FIG. 6, i.e. at the position identical with the axial position of the second layer coil 22.

When respective lead wires 23 and 24 reach the positions of the crossover bus bars 8U, 8V and 8W to be connected with, the lead wires 23 and 24 are bent perpendicularly toward the core back in the axial direction and merge into the crossover bus bars 8U, 8V and 8W. Then, the lead wires 23 and 24 are bent in the circumferential direction as the crossover bus bars.

Namely, according to this embodiment, the crossover bus bars 8U, 8V and 8W are arranged by elongating the lead wires 23 and 24 of the tooth coils 20. The crossover bus bars 8U, 8V and 8W arranged by respective lead wires 23 and 24 and extending in the circumferential direction are opposed with the opponent bus bars to be connected and welded, by edge to edge, at predetermined positions in the circumferential direction. According to this arrangement, the lead wires 23 and 24 can serve as bus bars. Thus, a simple structure is realized. The crossover bus bars 8U, 8V and 8W can be disposed compactly.

Modified Embodiment

The lead wires 23 and 24 and the crossover bus bars 8U, 8V and 8W disclosed in the above-described embodiments can be formed separately. More specifically, the crossover bus bars 8U, 8V and 8W can be connected with the lead wires 23 and 24 at the positions corresponding to the second layer coil 22 of the tooth coil 20. In this case, the crossover bus bars 8U, 8V and 8W are first bent in the axial direction to reach the positions corresponding to the second layer coil 22 of the tooth coil 20. Then, the crossover bus bars 8U, 8V and 8W are bent inward in the radial direction.

Another Modified Embodiment

The lead wires 23 and 24 and the crossover bus bars 8U, 8V and 8W disclosed in the above-described embodiments can be formed separately. More specifically, the terminal ends of the crossover bus bars 8U, 8V and 8W are first bent in the axial direction to reach the positions corresponding to the second layer coil 22 of the tooth coil 20, and are then opposed and welded at this portion with the front ends of the lead wires 23 or 24 extending from the inside in the radial direction.

Another Modified Embodiment

Figure 7:
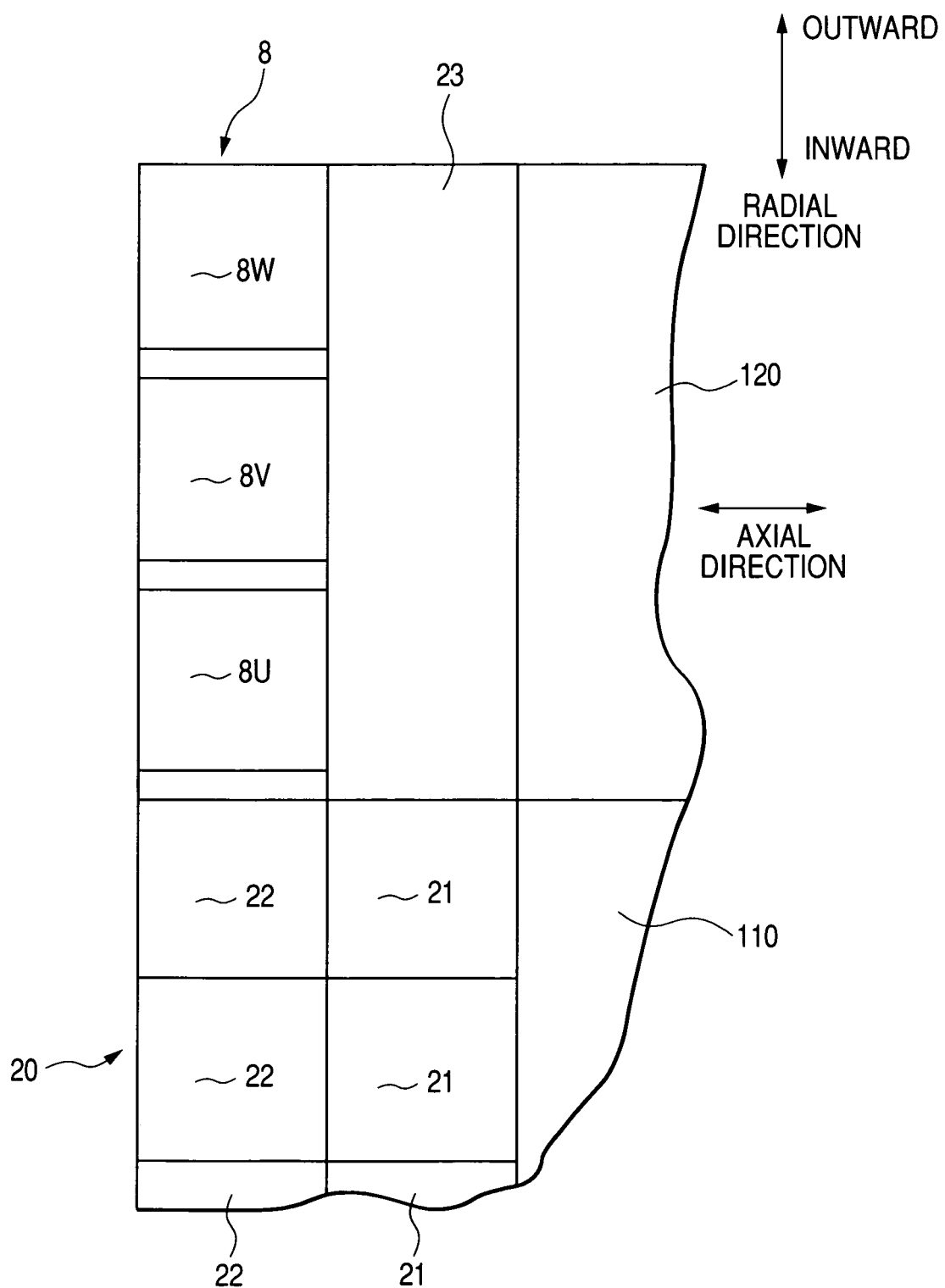
FIG. 7 is an enlarged cross-sectional view showing crossover bus bars of a stator employing proximal end extraction type two-layer winding stator coils in accordance with a modified embodiment of the present invention.

Furthermore, in the third embodiment explained with reference to FIG. 6, the positions of the lead wires 23 and 24 extending in the radial direction can be switched with the positions of the crossover bus bars 8U, 8V and 8W extending in the circumferential direction, as shown in FIG. 7.

What is claimed is:

1. A concentrated winding stator coil for an electric rotary machine, comprising:
   tooth coils provided for respective teeth, each tooth coil comprising a first layer coil wound on the surface of a tooth of a stator core in a direction advancing from a proximal end portion to a distal end portion of said tooth, a second layer coil disposed on said first layer coil and wound in a direction advancing from said distal end portion to said proximal end portion of said tooth, a winding start end and a winding terminal end disposed adjacently to said proximal end portion of said tooth, and a pair of lead wires extending outward in a radial direction from said winding start end and said winding terminal end;
   a predetermined number of crossover bus bars disposed in a circumferential direction to successively connect said lead wires of the tooth coils having the same phase, so as to arrange a phase winding consisting of all of the tooth coils having said same phase and serially connected; and
   neutral bus bars mutually connecting terminal ends of final tooth coils of respective phases to form a neutral point,
   wherein
   said crossover bus bars and said neutral bus bars are provided adjacently to a radial outer side of a coil end protruding in an axial direction of said tooth coil and also adjacently to one end face of a core back of said stator core; and
   said neutral bus bars are disposed at positions identical in both axial and radial directions with those of the bus bars of predetermined phase.

2. The concentrated winding stator coil for an electric rotary machine in accordance with claim 1, wherein said crossover bus bars are accommodated in a bus bar accommodation space which is shorter than the height of said coil end in an axial direction and shorter than a diameter of said core back.

3. The concentrated winding stator coil for an electric rotary machine in accordance with claim 2, wherein the lead wires of said tooth coils are connected to said crossover bus bars and said neutral bus bars in said bus bar accommodation space.

4. The concentrated winding stator coil for an electric rotary machine in accordance with claim 1, wherein said crossover bus bars are offset in the axial direction in a predetermined phase order, and the crossover bus bars of the same phase are disposed at same positions in both axial and radial directions.

5. The concentrated winding stator coil for an electric rotary machine in accordance with claim 1, wherein said crossover bus bars are offset in the radial direction in a predetermined phase order, and the crossover bus bars of the same phase are disposed at same positions in both axial and radial directions.

6. The concentrated winding stator coil for an electric rotary machine in accordance with claim 5, wherein said lead wires are extended substantially in the radial direction toward the crossover bus bars and the neutral bus bars, and connected to said crossover bus bars and said neutral bus bars at same positions in the axial direction.

* * * * *